(12) United States Patent
Woolley (10) Patent No.: US 9,636,944 B2
(45) Date of Patent: May 2, 2017

(54) IRRIGATION WHEEL TRACTION LUG

(71) Applicant: Joey Woolley, Amarillo, TX (US)

(72) Inventor: Joey Woolley, Amarillo, TX (US)

( * ) Notice: Subject to any disclaimer, the term of this patent is extended or adjusted under 35 U.S.C. 154(b) by 156 days.

(21) Appl. No.: 14/559,915

(22) Filed: Dec. 3, 2014

(65) Prior Publication Data

US 2015/0151570 A1    Jun. 4, 2015

Related U.S. Application Data

(60) Provisional application No. 61/911,464, filed on Dec. 3, 2013.

(51) Int. Cl.
*B60B 15/02* (2006.01)

(52) U.S. Cl.
CPC ........... *B60B 15/02* (2013.01); *B60Y 2200/22* (2013.01); *B60Y 2200/224* (2013.01)

(58) Field of Classification Search
CPC .............. B60B 15/02; B60Y 2200/224; B60Y 2200/22
USPC ......... 153/209, 225 R, 227, 228; 152/225 R, 152/227, 228
See application file for complete search history.

(56) References Cited

U.S. PATENT DOCUMENTS

| | | | | |
|---|---|---|---|---|
| 5,360,045 A | * | 11/1994 | Campbell | B60C 27/04 152/225 C |
| 5,451,001 A | * | 9/1995 | Kumm | A01G 25/09 239/726 |
| 5,865,916 A | * | 2/1999 | Woolley | B60C 27/20 152/225 R |
| 8,657,215 B1 | * | 2/2014 | Blum | B60B 1/10 239/726 |
| 9,266,506 B2 | * | 2/2016 | Korus | B60B 15/04 |
| 9,272,571 B2 | * | 3/2016 | Niblock | B60B 15/22 |
| 2006/0169797 A1 | * | 8/2006 | Kaltenheuser | B60C 3/04 239/147 |
| 2009/0084478 A1 | * | 4/2009 | Wallet | B60C 11/0311 152/209.13 |
| 2012/0241531 A1 | * | 9/2012 | Werner | B60C 11/0311 239/1 |

* cited by examiner

*Primary Examiner* — S. Joseph Morano
*Assistant Examiner* — Jean Charleston
(74) *Attorney, Agent, or Firm* — Shannon L Warren (57) ABSTRACT

An irrigation wheel traction lug, comprising a lug having a bent-paddle, a base and a one or more chains. Said bent-paddle comprises a first side, a second side and a front portion. Said bent paddle comprises a substantially "V" shape when viewed from above. Said first side and said second side flare backward away from a front portion of said base portion toward a rear edge. and Said lug selectively attaching to an irrigation wheel, having a tread pattern and a rim, by placing said base on said treat pattern, wrapping said one or more chains around said irrigation wheel between said rim and said tread pattern, and securing said lug to said irrigation wheel with said base and said one or more chains.

8 Claims, 15 Drawing Sheets

IRRIGATION WHEEL TRACTION LUG

CROSS-REFERENCE TO RELATED APPLICATIONS

This application claims benefit to U.S. Patent Application No. 61/911,464 (filed on 2013 Dec. 3), which is hereby incorporated by reference.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

This disclosure relates generally to an irrigation wheel traction lug. None of the known inventions and patents, taken either singularly or in combination, is seen to describe the instant disclosure as claimed. Accordingly, an improved irrigation wheel fraction lug would be advantageous.

BRIEF SUMMARY OF THE INVENTION

An irrigation wheel traction lug, comprising a lug having a bent-paddle, a base and a one or more chains. Said bent-paddle comprises a first side, a second side and a front portion. Said bent paddle comprises a substantially "V" shape when viewed from above. Said first side and said second side flare backward away from a front portion of said base portion toward a rear edge. and Said lug selectively attaching to an irrigation wheel, having a tread pattern and a rim, by placing said base on said treat pattern, wrapping said one or more chains around said irrigation wheel between said rim and said tread pattern, and securing said lug to said irrigation wheel with said base and said one or more chains.

DETAILED DESCRIPTION OF THE INVENTION

Described herein is an irrigation wheel traction lug. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
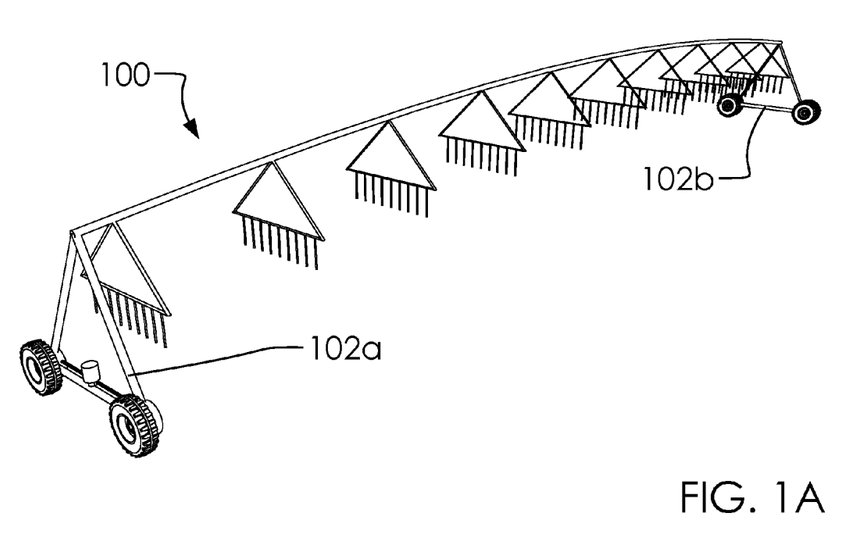
FIGS. 1A, 1B and 1C illustrate a perspective overview of an irrigation system, and a perspective rear and front view of a one or more wheel assemblies of said irrigation system.
Figure 1B:
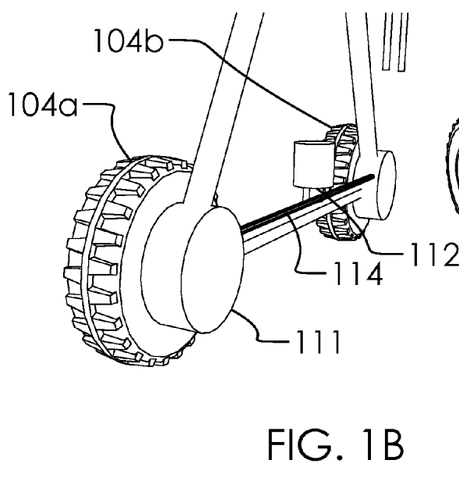
Figure 1C:
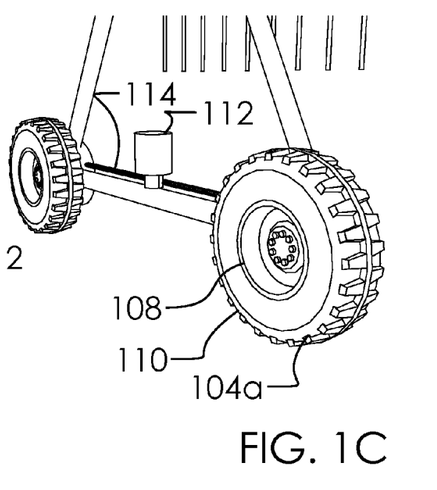

FIGS. 1A, 1B and 1C illustrate a perspective overview of an irrigation system 100, and a perspective rear and front view of a one or more wheel assemblies of said irrigation system 100. In one embodiment, said irrigation system 100 can comprise a one or more towers (such as a first tower 102a and a second tower 102b) which are supported on a one or more wheel assemblies (such as a first wheel assembly 104a and a second wheel assembly 104b). In one embodiment, each of said one or more wheel assemblies can comprise a rim 108, a tire 110 and a gearbox 111. In one embodiment, each of said one or more towers can comprise a motor 112 attached to a driveshaft 114. In one embodiment, said motor 112 can apply a torque force to said driveshaft 114, which can drive said gearbox 111 of each of said one or more wheel assemblies. In one embodiment, each of motor 112 can receive a power source (such as electrical power) from another portion of said irrigation system 100 (as is known in the art). In one embodiment, said one or more towers can provide support and movement force to said irrigation system 100.

In one embodiment, said one or more wheel assemblies of said irrigation system 100 are known to stick in the ground due to muddy soil or similar problems. One objective of the irrigation wheel traction lug (as discussed below) is to provide traction to said one or more wheel assemblies so that said irrigation system 100 can maintain movement about its axis.

Figure 2A:
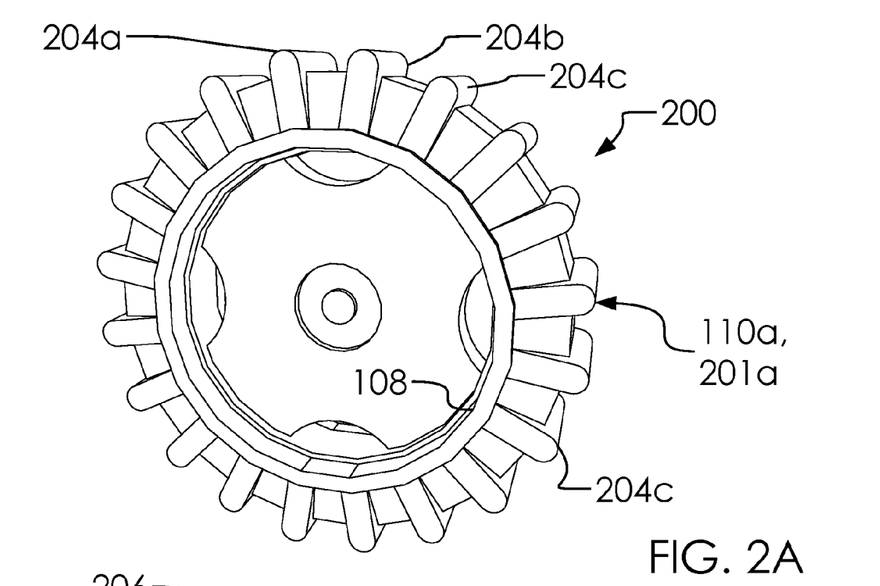
FIGS. 2A, 2B and 2C illustrate a perspective overview, an elevated front view and an elevated side view of a first plastic-tire-wheel.
Figures 2B, 2C:
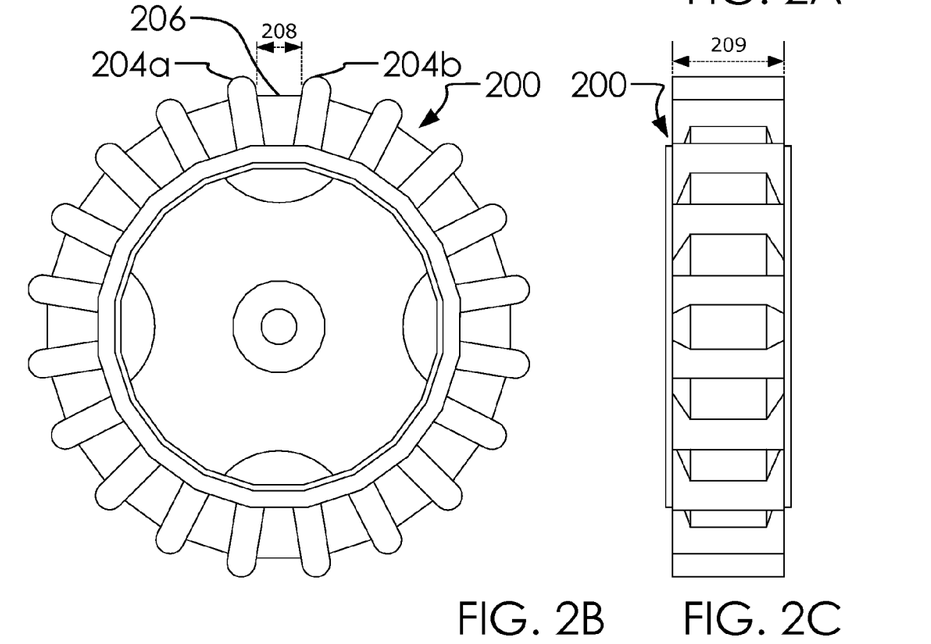

FIGS. 2A, 2B and 2C illustrate a perspective overview, an elevated front view and an elevated side view of a first plastic-tire-wheel 200. In one embodiment, said first plastic-tire-wheel 200 can comprise said rim 108 and a first plastic tire 110a having a tread patter 201a comprising of a plurality of bars. In one embodiment, said plurality of bars can comprise a first bar 204a, a second bar 204b and a third bar 204c, among many others, as illustrated. In one embodiment, said first plastic tire 110a can be substantially hollow. In one embodiment, said first plastic tire 110a can comprise of a Mach II® brand tire. In one embodiment, said first plastic tire 110a can comprise of a plastic material capable of rolling across a muddy soil, where an inflated rubber material might get caught. Nonetheless, said first plastic tire 110a are known to occasionally get stuck in muddy conditions. In one embodiment, each among said plurality of bars can be separated from one another by a gap 206 having a gap width 208. In one embodiment, said first plastic tire 110a can comprise a tire width 209.

Figure 2D:
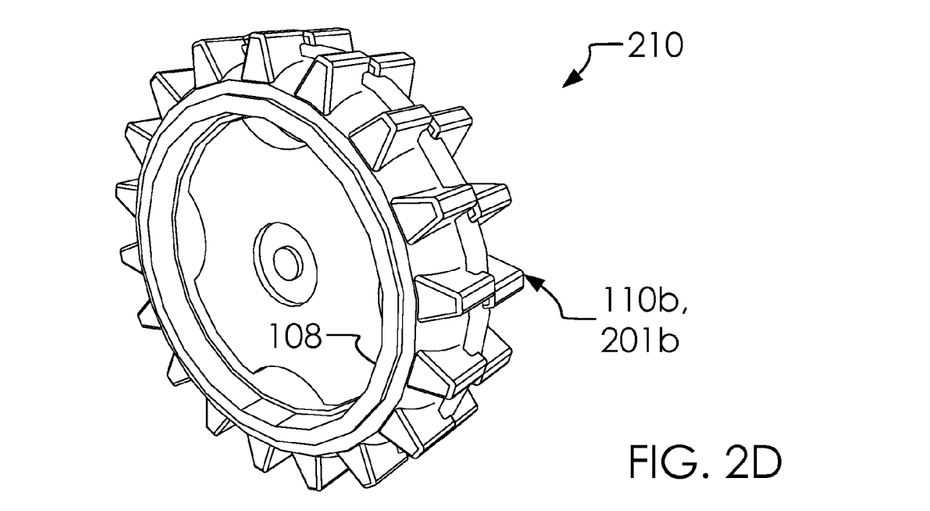
FIGS. 2D, 2E and 2F illustrate a perspective overview, an elevated front view and an elevated side view of a second plastic-tire-wheel.
Figures 2E, 2F:
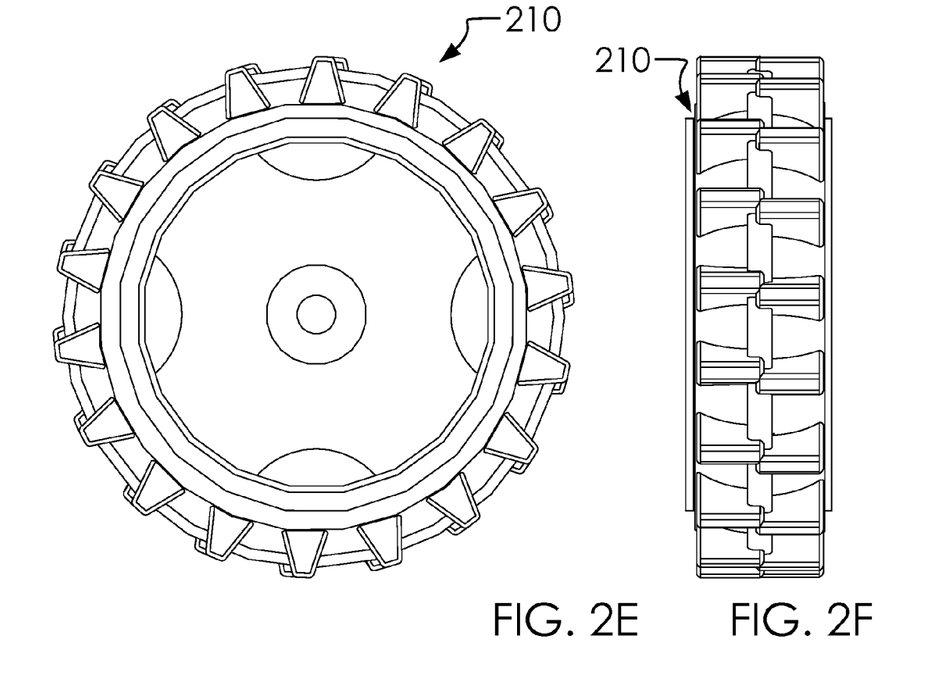

FIGS. 2D, 2E and 2F illustrate a perspective overview, an elevated front view and an elevated side view of a second plastic-tire-wheel 210. In one embodiment, said plastic-tire-wheel 210 can comprise similar properties to said first plastic-tire-wheel 200, except that said first plastic tire 110a is replaced by a second plastic tire 110b. In one embodiment, said second plastic tire 110b can comprise a tread pattern 201b which is different from said tread patter 201a. In one embodiment, said tread pattern 201b lacks said plurality of bars of said tread patter 201a. Accordingly, design goals for said irrigation wheel traction lug will be different as between said second plastic-tire-wheel 210 and said first plastic-tire-wheel 200.

Figure 2G:
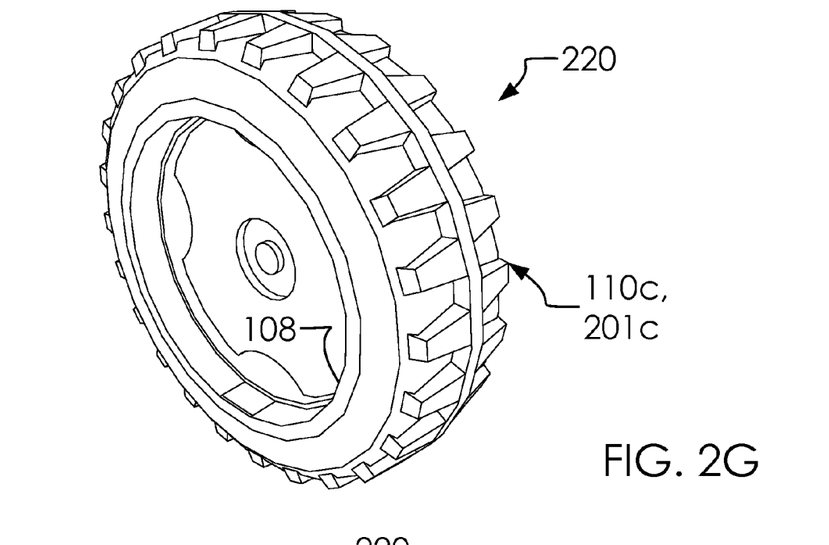
FIGS. 2G, 2H and 2I illustrate a perspective overview, an elevated front view and an elevated side view of a rubber-tire-wheel.
Figures 2H, 2I:
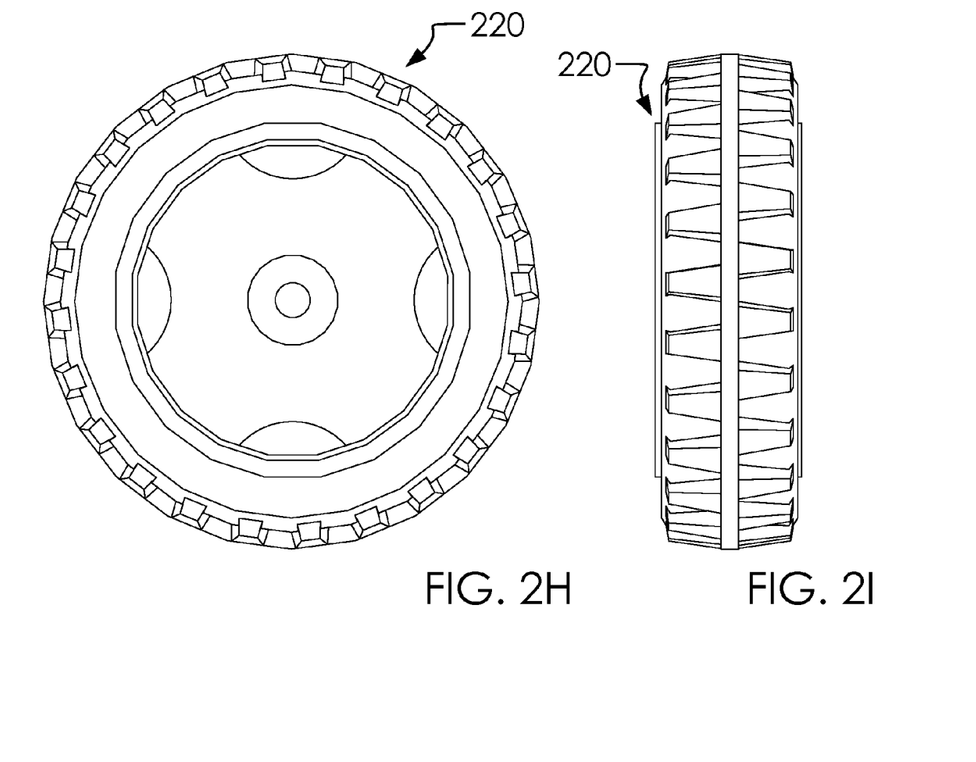

FIGS. 2G, 2H and 2I illustrate a perspective overview, an elevated front view and an elevated side view of a rubber-tire-wheel 220. In one embodiment, said rubber-tire-wheel 220 can comprise said rim 108 and a rubber tire 110c. In one embodiment, said rubber-tire-wheel 220 can comprise a conventional wheel as may be found in automotive use. In one embodiment, said rubber tire 110c can comprise a tread pattern 201c, which can be similar to said tread pattern 201b in that neither have said plurality of bars. In one embodiment, said second plastic tire 110b can be made of plastic and said rubber tire 110c can be made of rubber.

Figure 3A:
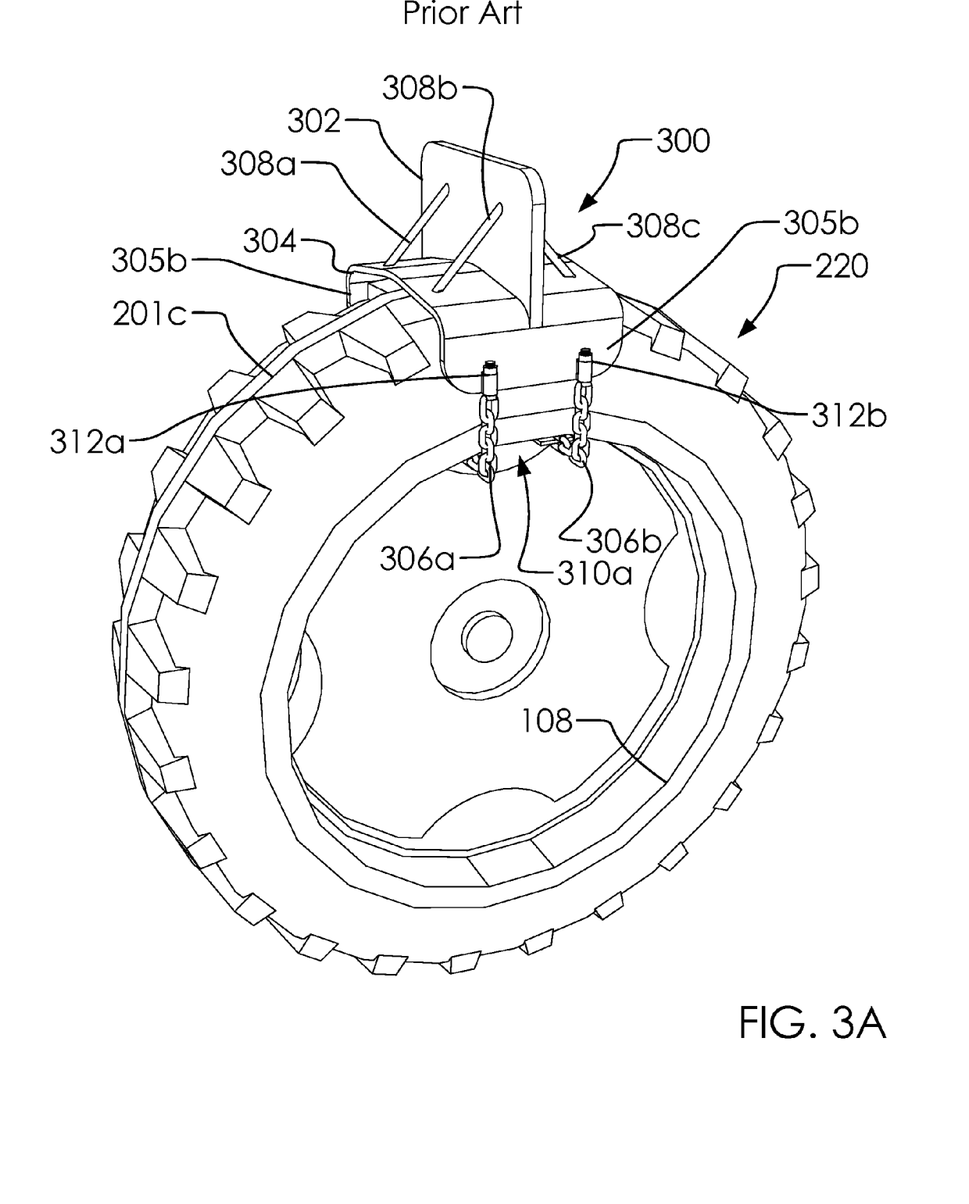
FIGS. 3A, 3B and 3C illustrate a perspective overview of a prior-art-lug on said rubber-tire-wheel, a first bent-paddle-lug on said rubber-tire-wheel, and a second bent-paddle-lug on said second plastic-tire-wheel.
Figure 3B:
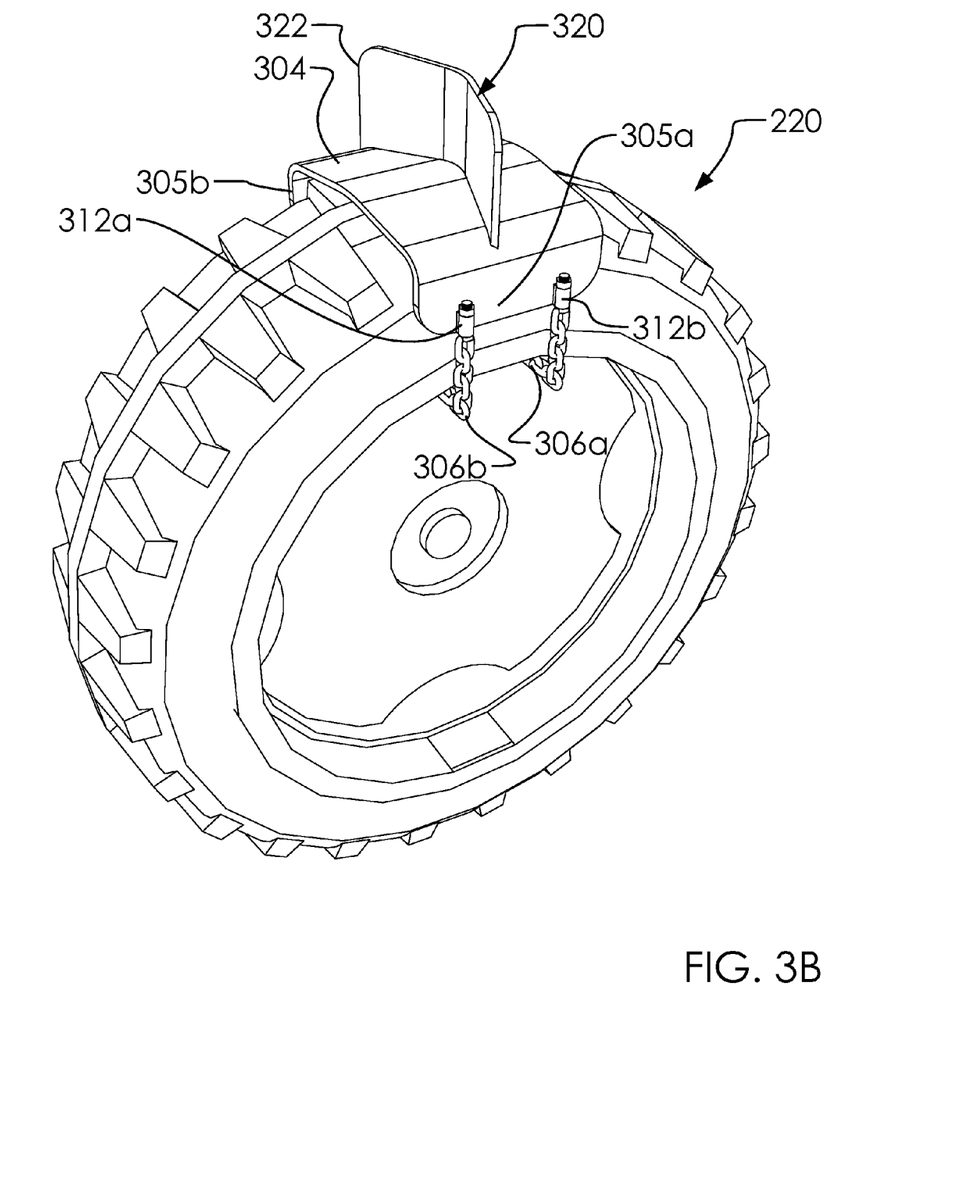
Figure 3C:
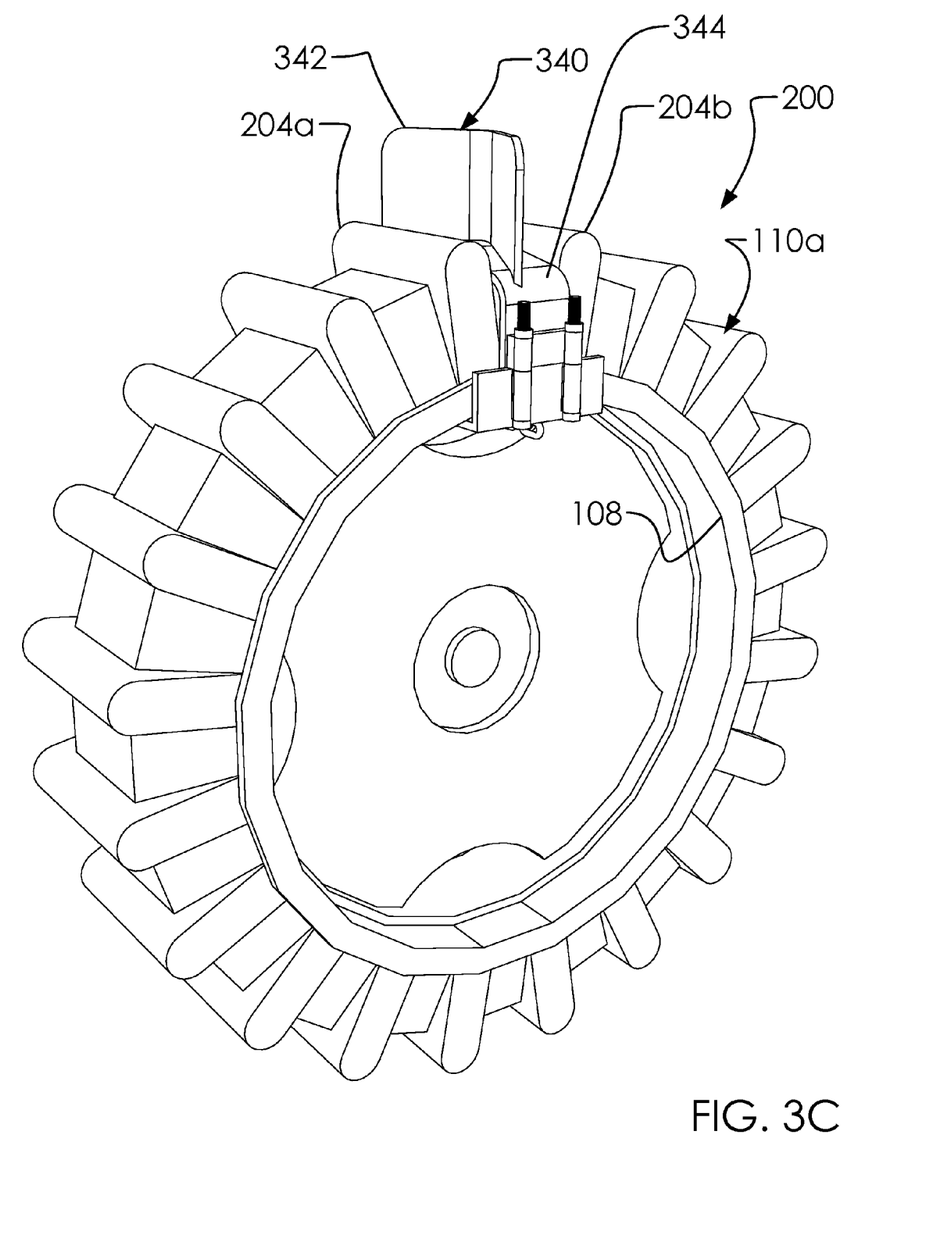

FIGS. 3A, 3B and 3C illustrate a perspective overview of a prior-art-lug 300 on said rubber-tire-wheel 220, a first bent-paddle-lug 320 on said rubber-tire-wheel 220, and a second bent-paddle-lug 340 on said second plastic-tire-wheel 210.

In one embodiment, said prior-art-lug 300 can comprise a straight paddle 302, a base 304 (having a first side portion 305a and a second side portion 305b), a one or more chains (comprising a first chain 306a and a second chain 306b), a one or more gussets (comprising a first gusset 308a, a second gusset 308b, a third gusset 308c, and a fourth gusset). In one embodiment, attaching said prior-art-lug 300 to said rubber-tire-wheel 220 can comprise: aligning said base 304 of said prior-art-lug 300 with said tread pattern 201c, straddling a portion of said rubber tire 110c between said first side portion 305a and second side portion 305b, attaching a first end of said one or more chains to said first side portion 305a, threading a portion of said one or more chains through a gap 310a in said rim 108, and attaching a second end of said one or more chains to said second side portion 305b. One flaw with said prior-art-lug 300 can be that said one or more gussets can capture mud and debris as said rubber-tire-wheel 220 turns through mud; wherein, said prior-art-lug 300 becomes less useful with mud under said one or more gussets. On the other hand, said one or more gussets are designed to support said straight paddle 302 as said rubber-tire-wheel 220 rotates through mud, so till now said prior-art-lug 300 has needed improvement. In one embodiment, said prior-art-lug 300 can comprise a one or more sockets (comprising a first socket 312a and a second socket 312b). In one embodiment, said one or more sockets can receive said second end of said one or more chains and hold them to said second side portion 305b.

Said first bent-paddle-lug 320 can comprise a bent paddle 322, said base 304, said one or more chains, and said one or more sockets. In one embodiment, said base 304 of said first bent-paddle-lug 320 can attach to said rubber-tire-wheel 220 in a similar manner as said prior-art-lug 300. One advantage of said bent paddle 322 is that said one or more gussets are no longer necessary to support said first bent-paddle-lug 320 as it is used to add fraction to said rubber-tire-wheel 220. The structural advantages of said bent paddle 322 would be obvious to one in the art.

In one embodiment, said second bent-paddle-lug 340 can comprise a bent paddle 342 (similar to said bent paddle 322), a base 344 (similar to said base 304), and a one or more lower portions. In one embodiment, said second bent-paddle-lug 340 can be adapted to fitting between two among said plurality of bars (such as said first bar 204a and said second bar 204b, as illustrated).

FIGS. 4A, 4B, 4C and 4D illustrate a perspective overview, an elevated top view, an elevated side view and an elevated front view of said second bent-paddle-lug 340. In one embodiment, said second bent-paddle-lug 340 can comprise said bent paddle 342, said base 344, said one or more lower portions (comprising a first lower portion 402a and a second lower portion 402b), a plurality of bolting assemblies (comprising a first bolting assembly 404a, a second bolting assembly 406a, and a third bolting assembly 404b and a fourth bolting assembly 406b), and a chain assembly 410. In one embodiment, said plurality of bolting assemblies can adjustably attach said base 344 to said one or more lower portions. In one embodiment, said one or more lower portions can comprise a substantially "L" shaped bracket. In one embodiment, said one or more lower portions can adjust horizontally relative to said bent paddle 342, as discussed below. In one embodiment, said one or more lower portions can be held horizontally relative to said bent paddle 342 by said plurality of bolting assemblies and vertically relative to one another by said chain assembly 410. In one embodiment, said base 344 can comprise a lug-depth 408 and an internal lug-width 409. In one embodiment, said internal lug-width 409 can be equal to or greater than said tire width 209; likewise, in one embodiment, said gap width 208 can be equal to or greater than said lug-depth 408; accordingly, said base 344 of said second bent-paddle-lug 340 has been designed to fit snuggly between said plurality of bars and around a portion of said first plastic tire 110a. In one embodiment, said one or more lower portions can each comprise a spacer. For example, in one embodiment, said first lower portion 402a can comprise a first spacer 412a, and said second lower portion 402b can comprise a second spacer 412b.

Figure 4A:
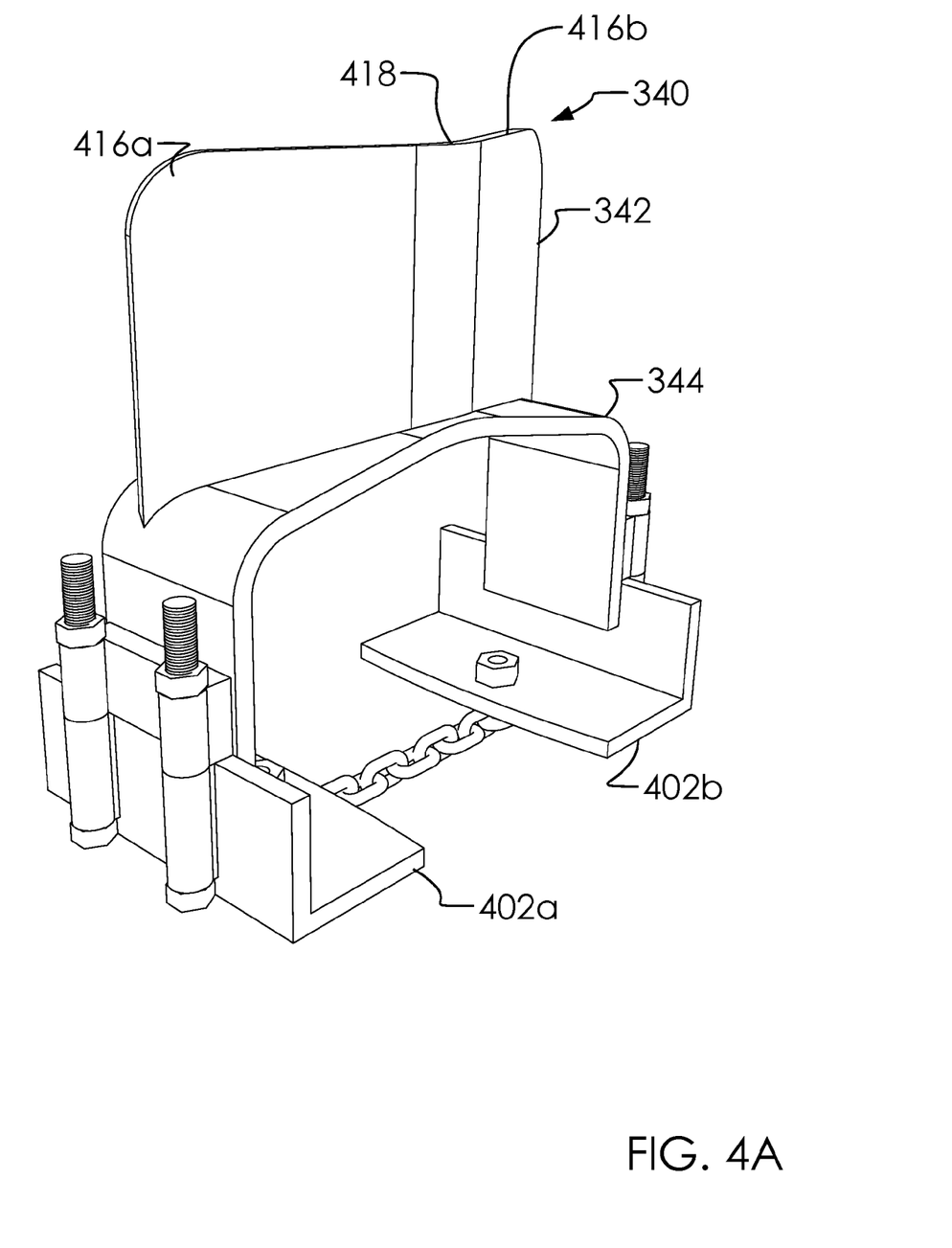
FIGS. 4A, 4B, 4C and 4D illustrate a perspective overview, an elevated top view, an elevated side view and an elevated front view of said second bent-paddle-lug.
Figure 4B:
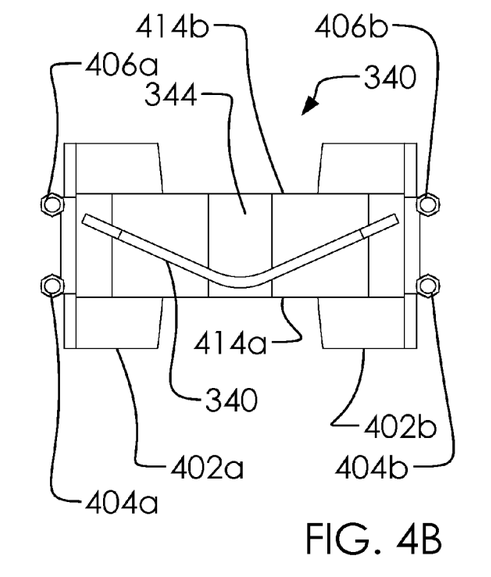
Figure 4C:
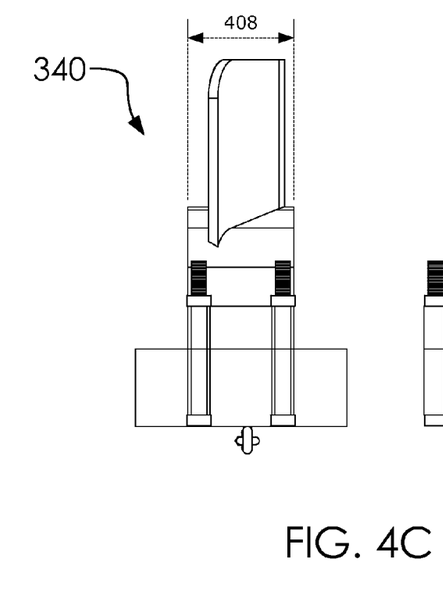
Figure 4D:
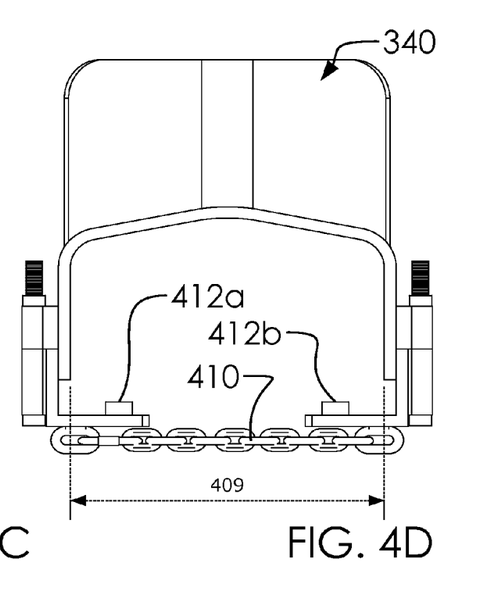

In one embodiment, said base 344 can comprise a front edge 414a and a rear edge 414b. In one embodiment, said second bent-paddle-lug 340 can comprise a first side 416a, a second side 416b and a front portion 418. In one embodiment, said bent paddle 342 can comprise a substantially "V" shape when viewed from above, as illustrated in FIG. 4B. In one embodiment, said front portion 418 can be closest to said front edge 414a and first side 416a and said second side 416b can be flare backward away from said front portion 418 toward said rear edge 414b.

Figure 5A:
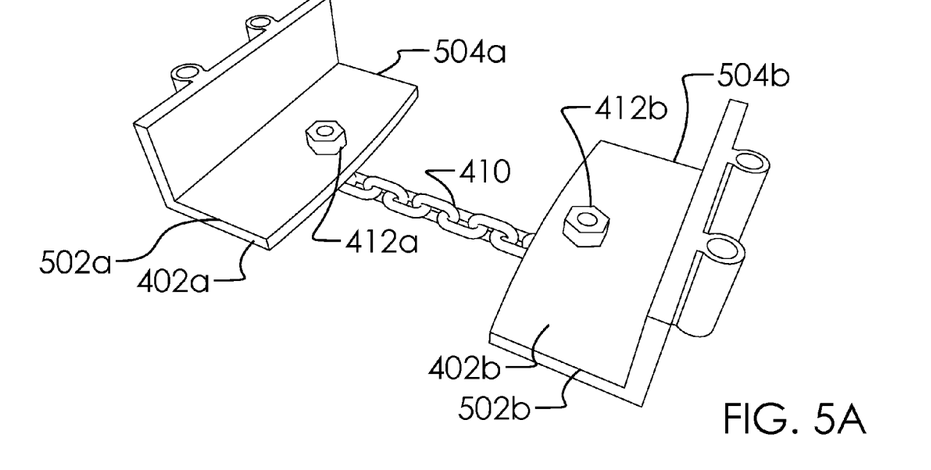
FIGS. 5A, 5B and 5C illustrate a perspective side view, an elevated side view, and an elevated top view of said one or more lower portions with said chain assembly.
Figure 5B:
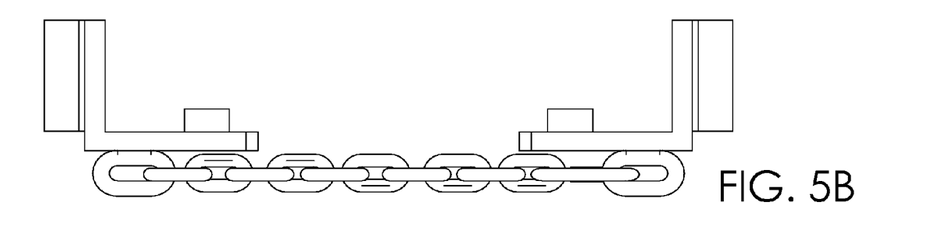
Figure 5C:
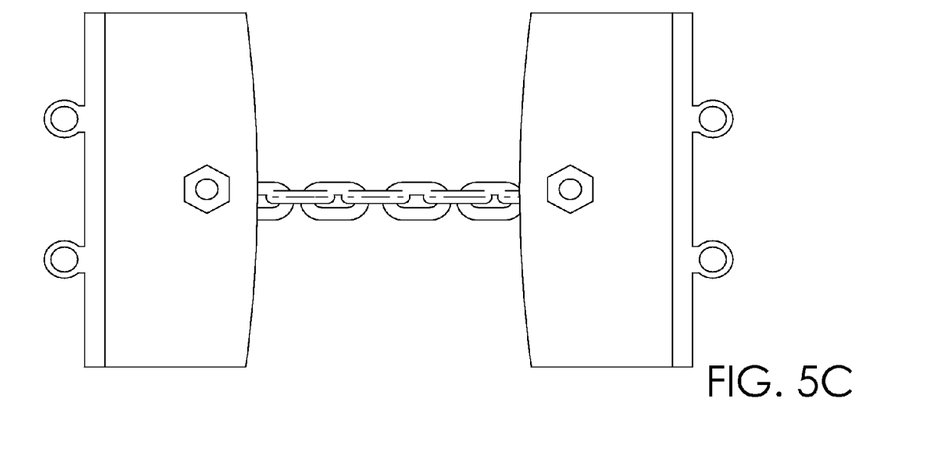

FIGS. 5A, 5B and 5C illustrate a perspective side view, an elevated side view, and an elevated top view of said one or more lower portions with said chain assembly 410. In one embodiment, each among said one or more lower portions can comprise a front edge (such as a first front edge 502a on said first lower portion 402a and a second front edge 502b on said second lower portion 402b) and a rear edge (such as a first rear edge 504a on said first lower portion 402a and a second rear edge 504b on said second lower portion 402b).

Figure 5D:
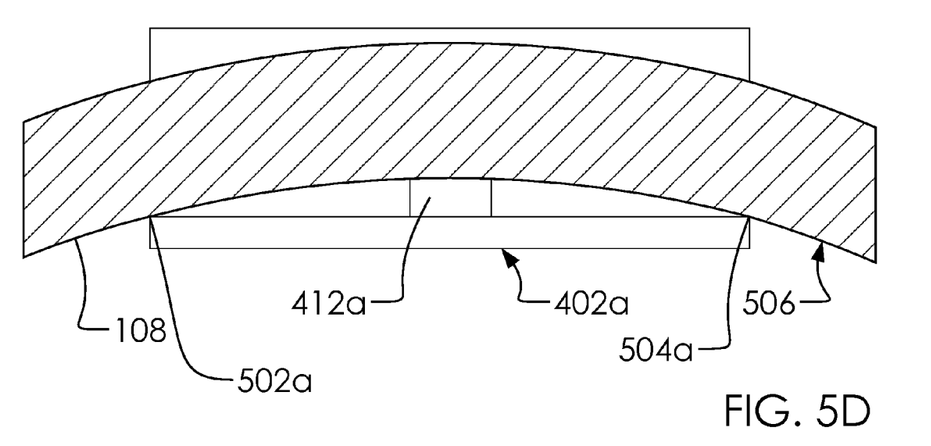
FIG. 5D illustrates an elevated side view of said one or more lower portions with a cross-section view of said rim.

FIG. 5D illustrates an elevated side view of said one or more lower portions with a cross-section view of said rim 108. In one embodiment, since said rim 108 is round in shape, said one or more lower portions must accommodate a rounded interior surface 506. For example, in one embodiment, said rounded interior surface 506 of said rim 108 can touch said first front edge 502a, then said first spacer 412a then said first rear edge 504a, as said first lower portion 402a is pressed upward into said rounded interior surface 506 of said rim 108, as will be discussed below.

Figure 6:
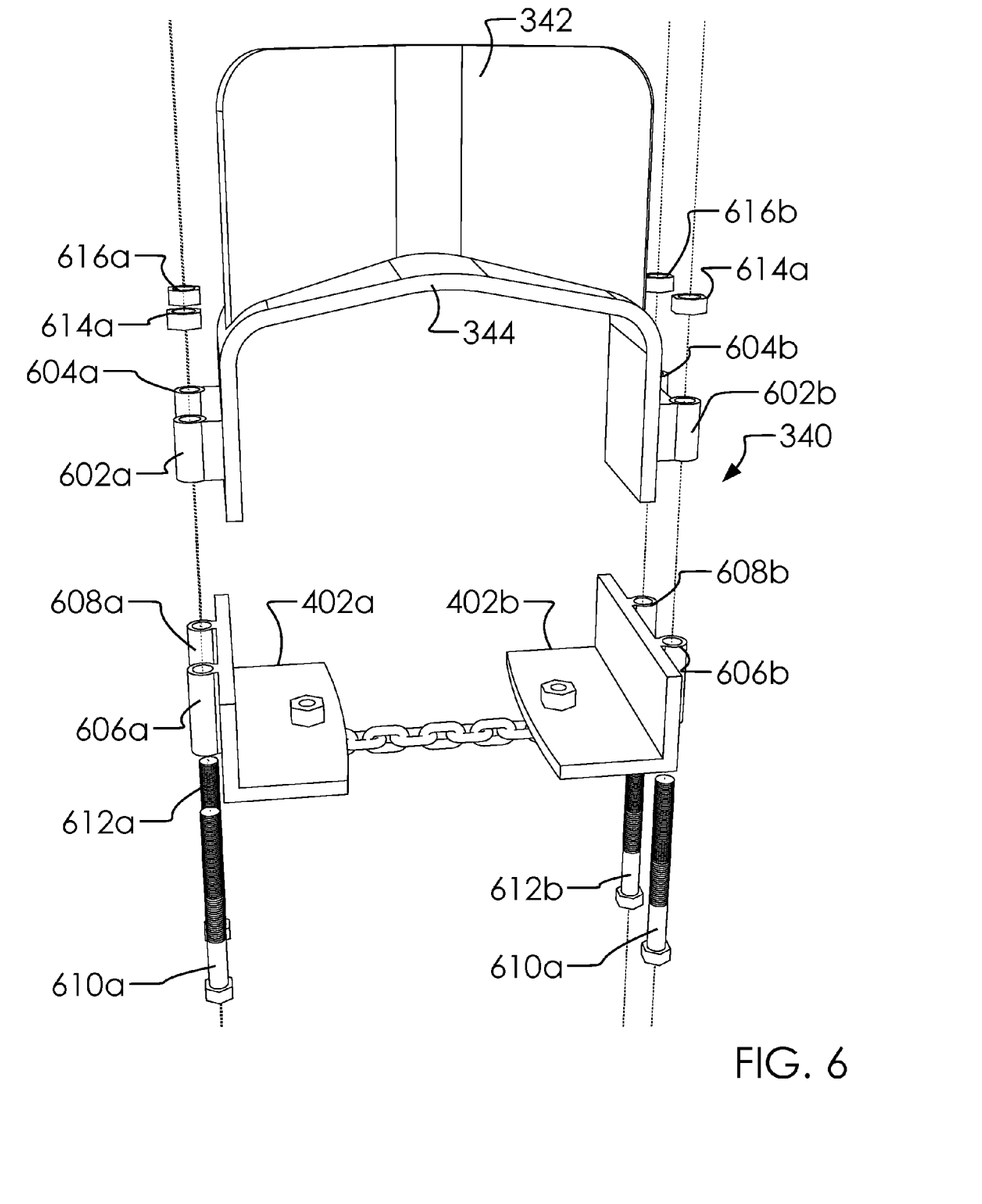
FIG. 6 illustrates a perspective exploded overview of said second bent-paddle-lug.

FIG. 6 illustrates a perspective exploded overview of said second bent-paddle-lug 340. In one embodiment, said first bolting assembly 404a can comprise a bolt 610a and a nut 614a; said second bolting assembly 406a can comprise a bolt 612a and a nut 616a; said third bolting assembly 404b can comprise a bolt 610b and a nut 614a; and said fourth bolting assembly 406b can comprise a bolt 612b and a nut 616b. In one embodiment, said base 344 can comprise a first-side-front eye 602a, a first-side-rear eye 604a, a second-side-front eye 602b, and a second-side-rear eye 604b. In one embodiment, said first lower portion 402a can comprise a first-side-front eye 606a, a first-side-rear eye 608a. In one embodiment, said second lower portion 402b can comprise a second-side-front eye 606b, and a second-side-rear eye 608b. In one embodiment, said bolting assemblies are assembled through said eyes with said bolts and secured with said nuts, as would be obvious to one in the art given this description and FIG. 6.

Figure 7:
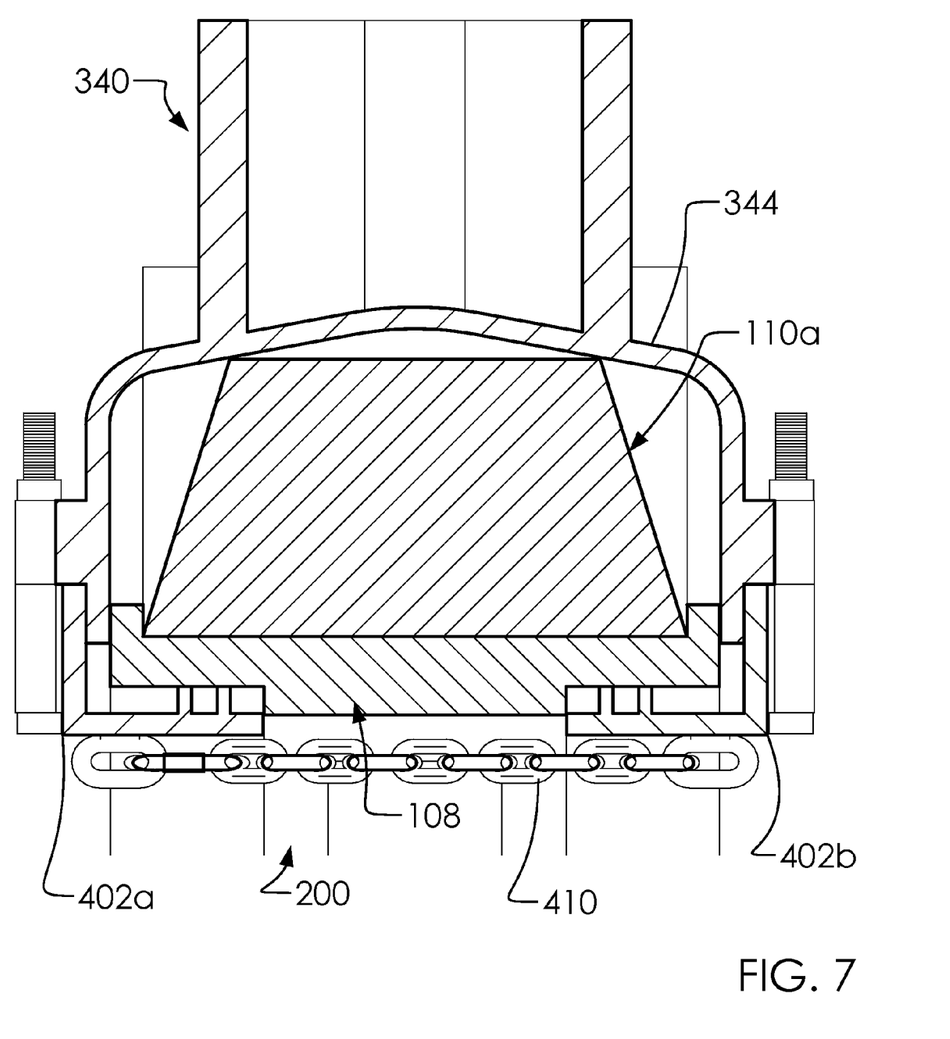
FIG. 7 illustrates an elevated cross-section side view of said first plastic-tire-wheel with said second bent-paddle-lug.

FIG. 7 illustrates an elevated cross-section side view of said first plastic-tire-wheel 200 with said second bent-paddle-lug 340. In one embodiment, said base 344 can fit snuggly around said first plastic tire 110a of said first plastic-tire-wheel 200. In one embodiment, said one or more lower portions can adjustably clamp under said rim 108 by tightening said plurality of bolting assemblies to squeeze said base 344 and said one or more lower portions toward each other and around said rubber-tire-wheel 220. In one embodiment, said chain assembly 410 can hold said one or more lower portions horizontally in toward one another, as illustrated, and that horizontal inward force can be applied below said rim 108.

Figure 8:
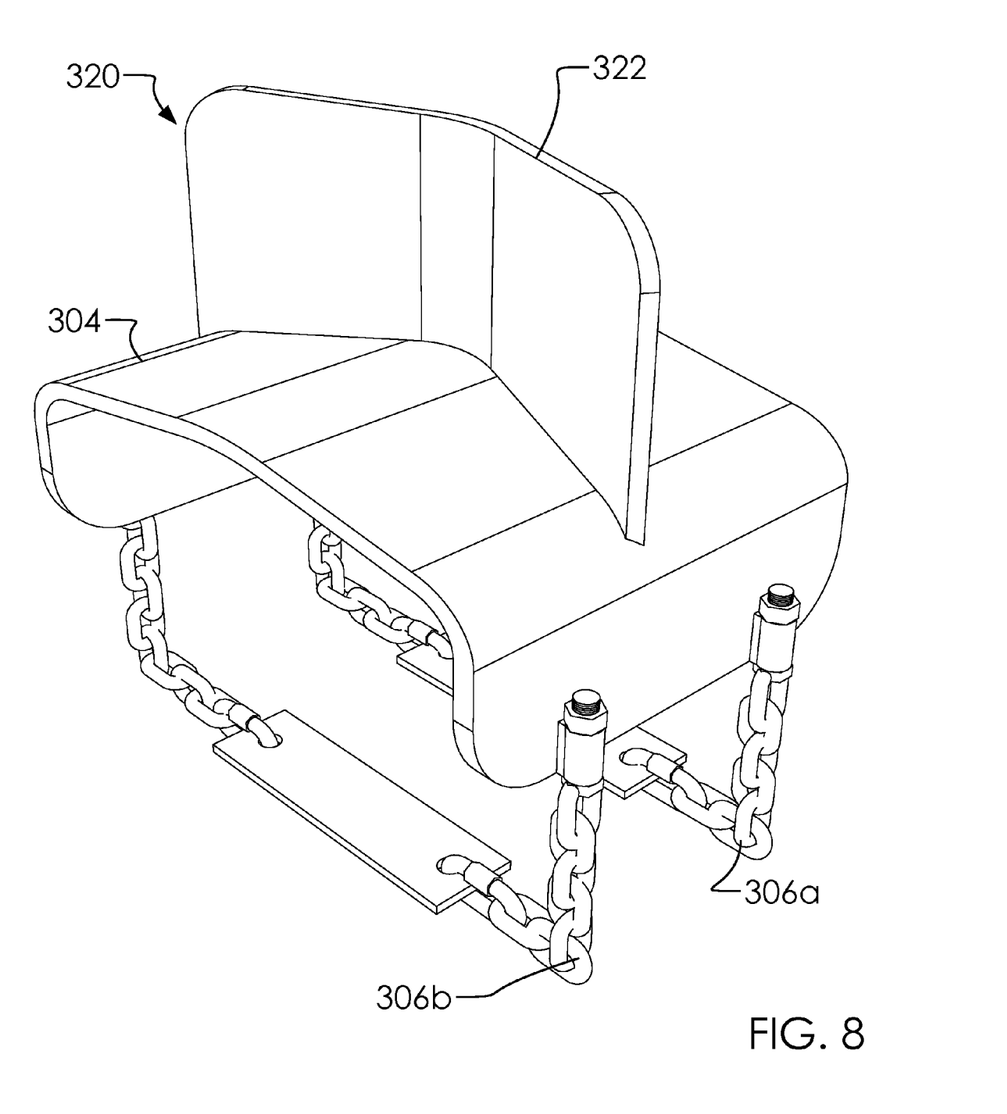
FIG. 8 illustrates a perspective overview said first bent-paddle-lug.

FIG. 8 illustrates a perspective overview said first bent-paddle-lug 320.

Figure 9A:
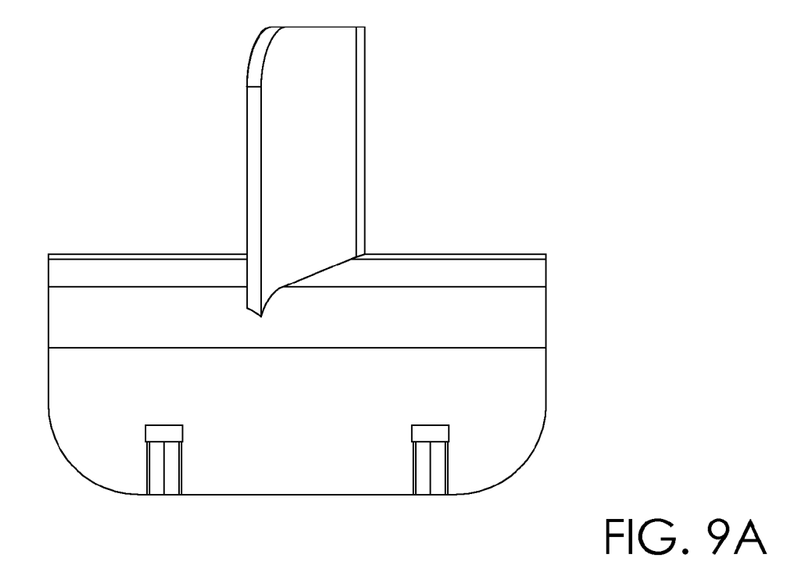
FIGS. 9A and 9B illustrate an elevated front view and an elevated side view said first bent-paddle-lug without said one or more chains.
Figure 9B:
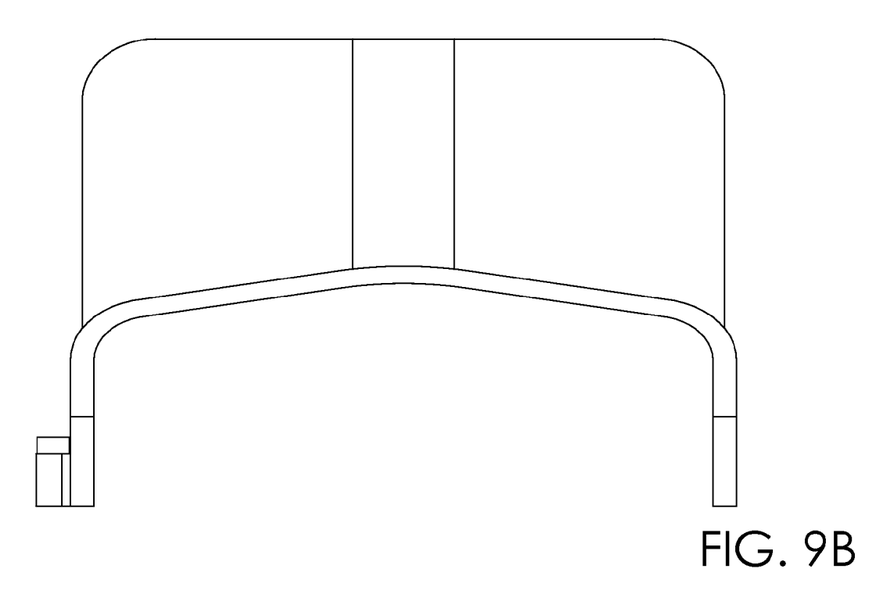

FIGS. 9A and 9B illustrate an elevated front view and an elevated side view said first bent-paddle-lug 320 without said one or more chains.

As claimed below, said first wheel assembly 104a, said second wheel assembly 104b, said first plastic-tire-wheel 200, said second plastic-tire-wheel 210, and said rubber-tire-wheel 220 can be referred to as an "irrigation wheel".

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An irrigation wheel traction lug, comprising:
a lug having a bent-paddle, a base and a one or more chains;
said bent-paddle comprises a first side, a second side and a front portion;
said bent paddle comprises a substantially "V" shape when viewed from above;
said first side and said second side flare backward away from a front portion of said base portion toward a rear edge;
said lug selectively attaching to an irrigation wheel, having a tread pattern and a rim, by
placing said base on said tread pattern,
wrapping said one or more chains around said irrigation wheel between said rim and said tread pattern, and
securing said lug to said irrigation wheel with said base and said one or more chains;
said log further comprises a first lower portion and a second lower portion;
said first lower portion is selectively attached to a first side portion of said base portion;
said second lower portion is selectively attached to a second side portion of said base portion;
said one or more chains comprise a chain assembly; and
said first lower portion and said second lower portion are selectively attached to one another with said chain assembly.

2. The irrigation wheel traction lug of claim 1 wherein,
said base portion comprises a first side portion, a second side portion, and a base;
said bent-paddle-attaches to said base of said base portion; and
said first side portion and said second side portions attached to the sides of said irrigation wheel.

3. The irrigation wheel traction lug of claim 1 wherein,
said bent paddle comprises a height;
said bent paddle is attached to said base portion; and
said height of said bent paddle can be extended to increase friction.

4. The irrigation wheel traction lug of claim 1 wherein,
said one or more chains attach to a first side portion and a second side portion of said base portion.

5. The irrigation wheel traction lug of claim 1 wherein,
said one or more chain assemblies selectively attach to said base portion with a one or more sockets and a one or more bolts.

6. The irrigation wheel traction lug of claim 1 wherein,
said lug is situated between a first bar and a second bar among said tire tread of said irrigation wheel.

7. An irrigation wheel traction lug, comprising:
a lug having a bent-paddle, a base and a one or more chains;

said bent-paddle comprises a first side, a second side and a front portion;

said bent paddle comprises a substantially "V" shape when viewed from above;

said first side and said second side flare backward away from a front portion of said base portion toward a rear edge;

said lug selectively attaching to an irrigation wheel, having a tread pattern and a rim, by
placing said base on said tread pattern,
wrapping said one or more chains around said irrigation wheel between said rim and said tread pattern, and
securing said lug to said irrigation wheel with said base and said one or more chains;

said base portion comprises a first side portion, a second side portion, and a base;

said bent-paddle-attaches to said base of said base portion;

said first side portion and said second side portions attached to the sides of said irrigation wheel;

said one or more chains attach to a first side portion and a second side portion of said base portion;

a first lower portion and a second lower portion;

said first lower portion is selectively attached to a first side portion of said base portion;

said second lower portion is selectively attached to a second side portion of said base portion;

said one or more chains comprise a chain assembly;

said first lower portion and said second lower portion are selectively attached to one another with said chain assembly; and said one or more chain assemblies selectively attach to said base portion with a one or more sockets and a one or more bolts.

8. The irrigation wheel traction lug of claim 7 wherein, said lug is situated between a first bar and a second bar among said tire tread of said irrigation wheel.

* * * * *